(12) United States Patent
Hegedusch et al.

(10) Patent No.: US 12,528,333 B2
(45) Date of Patent: Jan. 20, 2026

(54) CLOSING APPARATUS AND AIRFLOW DEVICE

(71) Applicant: Dr. Ing. h.c. F. Porsche Aktiengesellschaft, Stuttgart (DE)

(72) Inventors: Tobias Hegedusch, Oberriexingen (DE); Tim Biberacher, Ehingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 346 days.

(21) Appl. No.: 18/216,653

(22) Filed: Jun. 30, 2023

(65) Prior Publication Data
US 2024/0001733 A1 Jan. 4, 2024

(30) Foreign Application Priority Data
Jul. 1, 2022 (DE) .................. 10 2022 115 501.9

(51) Int. Cl.
*B60H 1/00* (2006.01)
*B60H 1/34* (2006.01)
*F16K 7/08* (2006.01)
*F24F 13/10* (2006.01)

(52) U.S. Cl.
CPC ....... *B60H 1/00685* (2013.01); *F24F 13/105* (2013.01)

(58) Field of Classification Search
CPC ....... F24F 13/0218; F24F 13/105; F16K 7/08; B60H 1/00564; B60H 1/00664; B60H 1/00685; B60H 1/34; B60H 1/3407
See application file for complete search history.

(56) References Cited

U.S. PATENT DOCUMENTS

| | | | |
|---|---|---|---|
| 7,021,604 B1 * | 4/2006 | Werner | F16K 7/08 251/212 |
| 8,025,641 B2 * | 9/2011 | Bettuchi | A61B 17/3462 604/167.03 |
| 2005/0092944 A1 * | 5/2005 | Patterson | F16K 7/08 251/4 |

FOREIGN PATENT DOCUMENTS

| | | | | |
|---|---|---|---|---|
| DE | 202010000678 U1 | 5/2010 | | |
| GB | 363365 A | * 12/1931 | ............... | F16K 7/08 |

* cited by examiner

*Primary Examiner* — Steven S Anderson, II
(74) *Attorney, Agent, or Firm* — Buchanan Ingersoll & Rooney PC

(57) ABSTRACT

A closing apparatus for a fluid passage having a closing body arranged in the fluid passage. In order to simplify the regulated air supply in a motor vehicle, the closing body includes a definedly deformable base structure surrounded by a wrapper, which more or less closes the fluid passage as a function of the deformation of the base structure. The closing body closes the fluid passage when the base structure takes up a closed position with the wrapper. And, the closing body partially releases the fluid passage when the base structure with the wrapper takes up an opened position.

12 Claims, 3 Drawing Sheets

CLOSING APPARATUS AND AIRFLOW DEVICE

CROSS-REFERENCE TO RELATED APPLICATION

This application claims priority to German Patent Application No. 10 2022 116 501.9, filed Jul. 1, 2022, the content of such application being incorporated by reference herein in its entirety.

FIELD OF THE INVENTION

The invention relates to a closing apparatus for a fluid passage, having a closing body arranged in the fluid passage. The invention further relates to an airflow device having an air supply in which at least one such closing apparatus is arranged.

BACKGROUND OF THE INVENTION

DE 20 2010 000 678 U1, which is incorporated by reference herein, describes an apparatus to be arranged on or in an aperture with at least one tubular part is known, which is provided so as to define a passage, wherein the tubular part is at least partially substantially hyperboloidally deformable.

SUMMARY OF THE INVENTION

Described herein is a simplified regulated air supply in a motor vehicle.

In a closing apparatus for a fluid passage having a closing body which is arranged in the fluid passage, the problem is solved in that the closing body comprises a definedly deformable base structure surrounded by a wrapper, which more or less closes the fluid passage as a function of the deformation of the base structure, wherein the closing body closes the fluid passage when the base structure with the wrapper takes up a closed position, wherein the closing body partially releases the fluid passage when the base structure with the wrapper takes up an opened position. In the closed position, the closing body completely or nearly completely closes the fluid passage. In the opened position, the volume of the closing body in the fluid passage decreases, thereby releasing an opening cross-section or aperture cross-section in the fluid passage from the closing body. However, the closing body, which remains in the fluid passage, still has a volume when the base structure with the wrapper takes up its opened position. Accordingly, the fluid passage through the closing body is not fully released when the base structure with the wrapper takes up its opened position.

A preferred embodiment example of the closing apparatus is characterized in that the base structure comprises equally long rods, which are attached at their ends facing away from one another to two parallel and coaxially arranged retaining plates, which are rotatable relative to one another in order to definedly deform the base structure. Thus, the base structure can be deformed with the wrapper relatively simply in order to allow for an adjustable fluid passage with the closing apparatus. One of the retention plates can be fixedly arranged. The other retaining plate can then be twisted with a suitable adjusting device in order to ensure the desired deformation of the base structure with the wrapper. The base structure can be continuously deformed with the wrapper in a particularly advantageous manner by twisting the two retaining plates relative to one another. The twisting of at least one of the retention plates relative to the other retention plate can be done manually or with an appropriate drive in a straightforward manner.

Another preferred embodiment example of the closing apparatus is characterized in that the retaining plates are configured as disks. The retaining plates have the design of circular disks, for example. This simplifies the manufacture and handling of the closing apparatus.

A further preferred embodiment example of the closing apparatus is characterized in that the rods are hinged to the retention plates. As a result, a comfortable adjustment of the closing apparatus with the definedly deformable base structure is enabled in a simple manner. It is thereby assumed that the distance between the retaining plates changes slightly when the retaining plates are twisted relative to one another.

Another preferred embodiment example of the closing apparatus is characterized in that the rods are completely surrounded by the wrapper between their ends facing away from one another. Thus, the realization of a fluid-tight closing body in the fluid passage is facilitated in a simple manner.

Another preferred embodiment example of the closing apparatus is characterized in that the wrapper is formed from a flexible material. This enables the desired functionality in a simple manner. The flexible material is advantageously matched in terms of its sealability to the fluid flowing through the fluid passage.

A further preferred embodiment example of the closing apparatus is characterized in that the base structure with the wrapper in the closed position takes up the form of a straight, circular cylinder, wherein the base structure with the wrapper in the opened position takes up the form of a rotational hyperboloid. For example, a rectangular aperture cross-section can be completely or almost completely closed and partially released using simple means. The elongated base structure is arranged with its longitudinal axis preferably transverse to a direction of fluid flow.

The aforementioned problem is alternatively or additionally solved by an airflow device having an air supply, in which at least one closing apparatus described above is arranged. The airflow device is preferably arranged in a motor vehicle and serves to regulate an air inlet into a vehicle interior or an air outlet out of the vehicle interior. The elongated closing apparatus is arranged with its longitudinal axis preferably transverse to an airflow direction.

A preferred embodiment example of the airflow device is characterized in that the air supply comprises an air aperture with an aperture cross-section in which at least two closing apparatuses are arranged parallel to one another. Thus, an adaptive air flap control in a motor vehicle can advantageously be replaced with the airflow device.

A further preferred embodiment example of the airflow device is characterized in that the aperture cross-section is rectangular. In the rectangular cross-section, multiple closing apparatuses can be arranged parallel to one another. Moreover, multiple closing apparatuses can be arranged coaxially to one another. For example, the cooling requirement in the motor vehicle can be regulated very conveniently by simple means.

BRIEF DESCRIPTION OF THE DRAWINGS

Further advantages, features, and details of the invention arise from the following description, in which various embodiment examples of the invention are described in detail with reference to the drawing. The figures show.

DETAILED DESCRIPTION OF THE INVENTION

In FIGS. 1 to 5, an airflow device 1 is shown in various views and states. The airflow device 1 serves to regulate an air supply indicated in FIG. 3 by arrows 3, 4, 5, 6 in an interior space of a motor vehicle. For this purpose, the airflow device 1 comprises an air aperture 2. The air aperture 2 is an air inlet or an air outlet in the motor vehicle, for example. The air aperture 2 has a rectangular aperture cross-section 7.

Figure 3:
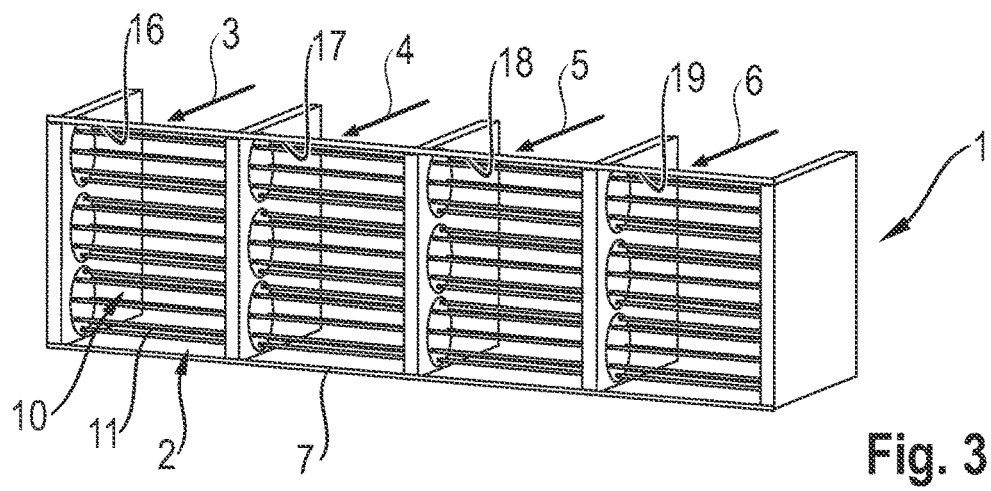
FIG. 3 the airflow device of FIG. 1 with a total of twelve closing apparatuses, wherein wrappers of the closing apparatuses are not shown in order to make the base structure underneath the wrappers visible.
Figure 4:
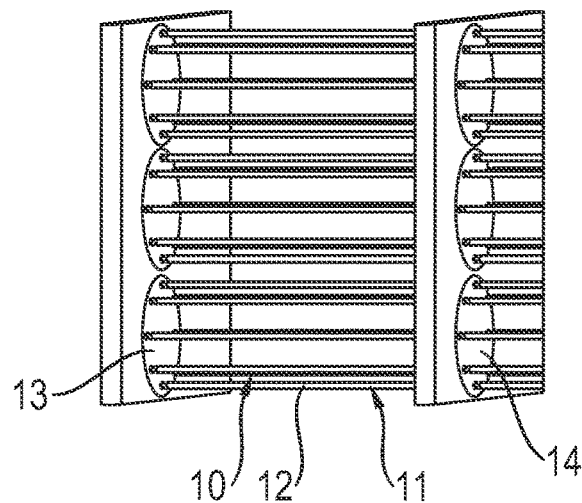
FIG. 4 an enlarged excerpt from FIG. 3, wherein the base structures take up their respective closed position.
Figure 5:
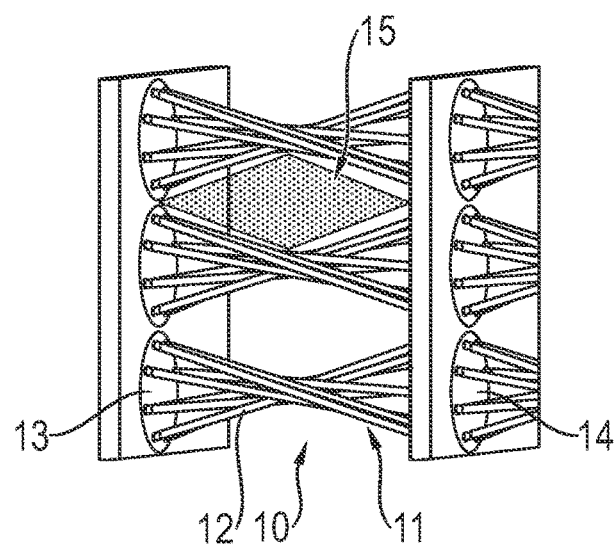
FIG. 5 the same excerpt as in FIG. 4, wherein the base structures take up their respective opened position.

A total of twelve closing apparatuses 10 are arranged in the aperture cross-section 7 of the airflow device 1. The closing apparatuses 10 are shown in FIGS. 3 to 5 without a wrapper 8 shown in FIGS. 1 and 2 in order to make a base structure 11 arranged underneath the wrapper 8 visible. The base structure 11 with the wrapper 8 represents a closing body 20 of the closing apparatus 10.

In FIG. 3, in each case three closing apparatuses are arranged one above the other, wherein in each case four closing apparatuses 10 are arranged adjacent to one another in the longitudinal direction. The aperture cross-section 7 is divided into a total of four partial aperture cross-sections 16, 17, 18, 19, in which three closing apparatuses 10 are arranged in parallel above one another.

Figure 1:
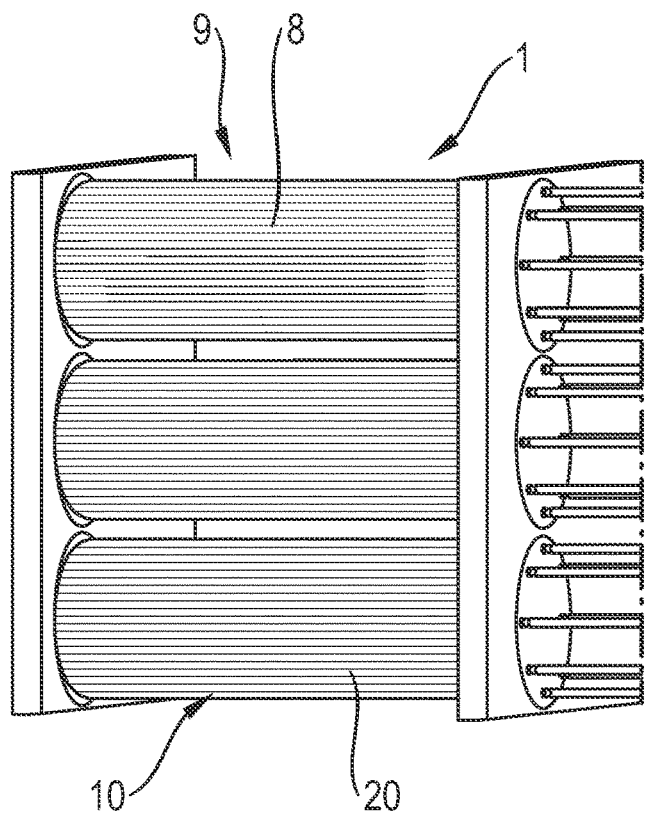
FIG. 1 an excerpt of an airflow device with three closing apparatuses arranged in parallel in a perspective view in a closed state.
Figure 2:
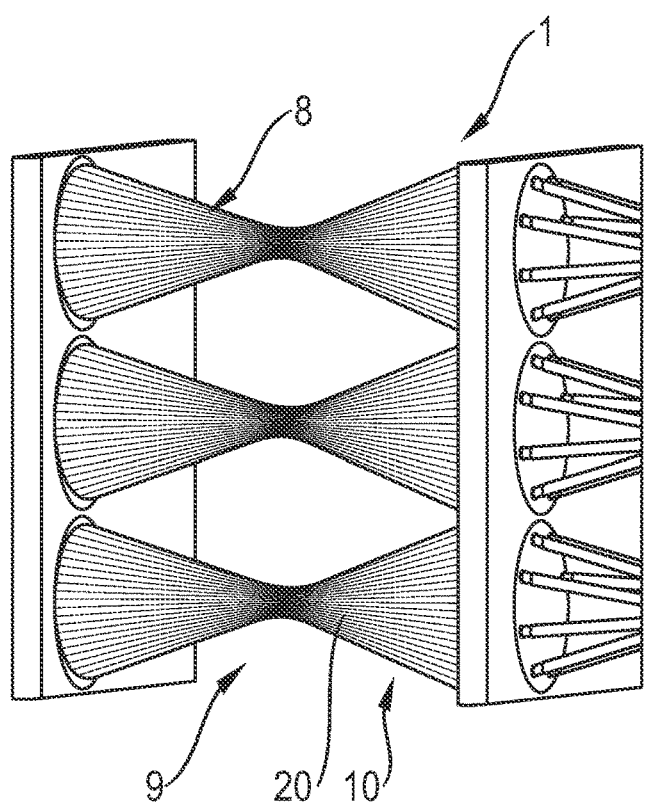
FIG. 2 the airflow device of FIG. 1 with the closing apparatuses in an opened state.

In FIGS. 1 and 2, it is illustrated how a fluid passage 9 can be closed and released with three closing apparatuses 10. In FIG. 1, the closing bodies 20 of the closing apparatuses 10 are in their closed position. In their closed position, the closing bodies 20 are in the form of straight, circular cylinders.

A distance between the closing bodies 20 in their closed position allows for the passage of fluid even with the closing apparatuses 10 closed. This passage of fluid, which can be desired, can be reduced by minimizing the distance between the closing bodies 20 to zero in their closed position.

In FIG. 2, the closing bodies 20 of the closing apparatuses 10 take up their opened position. In the opened position, the closing bodies 20 each have the shape of a rotational hyperboloid. This results in rhomboid openings between two respective closing bodies 20 in their opened position, which allow the fluid to pass.

FIGS. 4 and 5 illustrate how the base structure 11 of the closing bodies 20 of the closing apparatuses 10 can be continuously adjusted between the opened position and the closed position. The base structure 11 comprises rods of equal length 12. The equally long rods 12 are hinged to two retaining plates 13, 14 with their ends facing away from one another.

The hinge points of the rods 12 are arranged circularly on the retaining plates 13 and 14. This results in the circular cylinder-shaped arrangement of the rods 12 in the closed position of the closing apparatus 10 shown in FIG. 4.

FIG. 5 shows what happens when the retaining plates 13, 14 are twisted relative to one another. As can be seen in FIG. 5, the relative twisting of the retaining plates 13, 14 respectively causes the rods 12 to take up the shape of a rotational hyperboloid. This results in a rhomboid opening cross-section 15 between two respective closing bodies in their opened position.

With the wrapper 8 of the closing apparatuses 10 shown in FIGS. 1 and 2, an undesirable passage of fluid between the rods 12 of the respective base frame 11 in both the closed position and the opened position is prevented.

Figure 6:
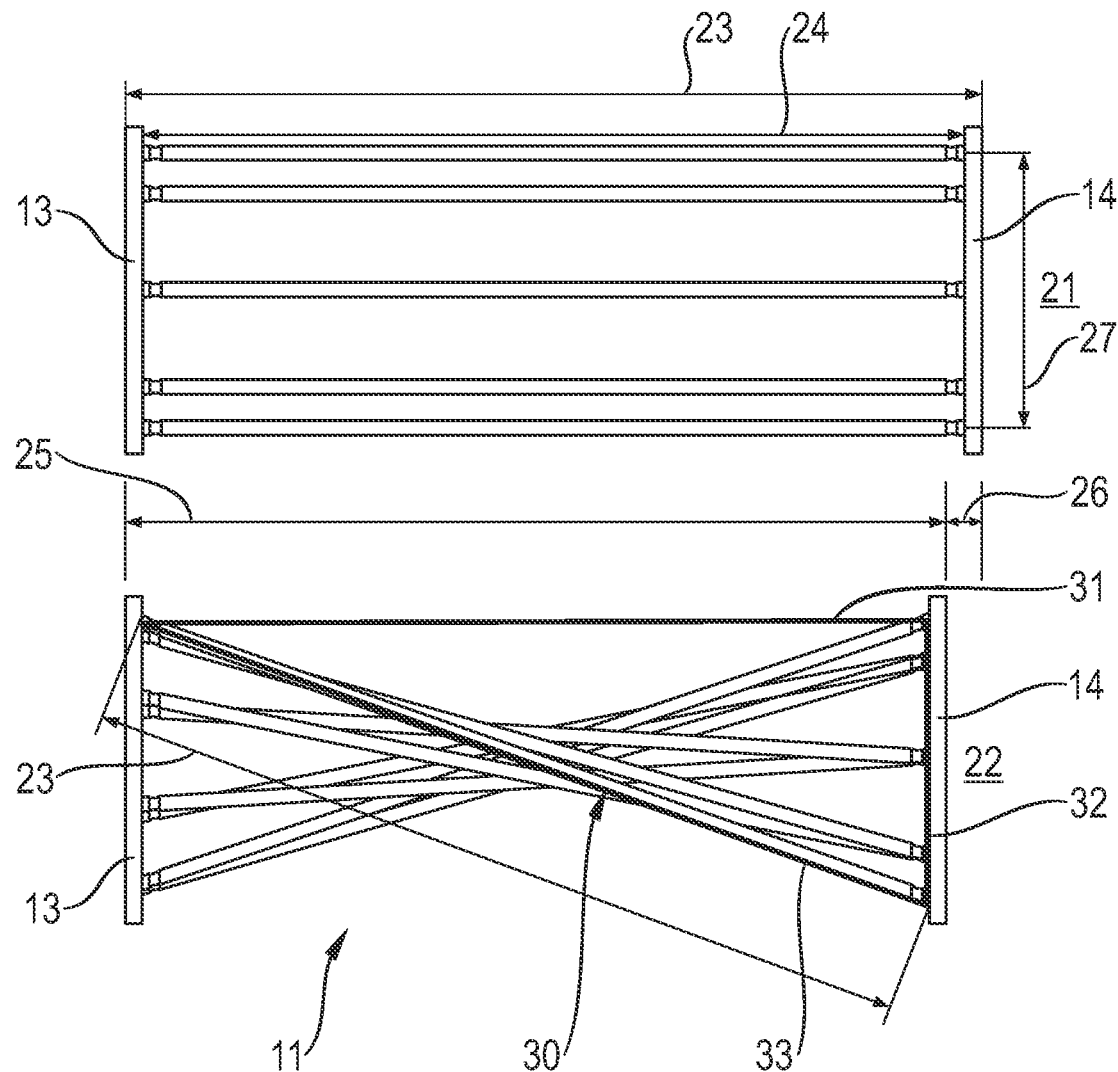
FIG. 6 one of the base structures of the closing apparatus alone in a perspective view in the opened position and in the closed position.

In FIG. 6, the base structure 11 is shown in a perspective view in its closed position 21 and its opened position 22, respectively. A double arrow 23 denotes the length of the rods 12. The length 23 of the rods 12 is fixed.

A double arrow 24 denotes a distance between the retaining plates 13, 14 in the closed position. A distance of the retaining plate 13, 14 in the opened position 22 is indicated by a double arrow 25. Due to the fixed length 23 of the rods 12, there is a difference 26, also indicated by a double arrow.

The difference 26 is recognized in the closing apparatus and can be compensated by arrangement of, for example, the retaining plate 14 in a recess, which is sized so as to receive the retaining plate 14 in both the opened position 22 and the closed position 21.

The retaining plates 13, 14 preferably have the shape of circular disks. The recess then advantageously also has a circular diameter. A double arrow 27 denotes a diameter of the retaining plate 14 configured as a circular disk.

In FIG. 6, it is illustrated by a right-angled triangle 30 with catheti 31, 32 and a hypotenuse 33 how the reduction of the distance 24, 25 between the retaining plates 13, 14 can be calculated when twisting between the closed position 21 and the opened position 22.

REFERENCE NUMBERS

1 Airflow device
2 Air aperture
3 Arrow
4 Arrow
5 Arrow
6 Arrow
7 Aperture cross-section
8 Wrapper
9 Fluid passage
10 Closing apparatus
11 Base structure
12 Rods
13 Retaining plate
14 Retaining plate
15 Rhomboid opening cross-section
16 Partial aperture cross-section
17 Partial aperture cross-section
18 Partial aperture cross-section
19 Partial aperture cross-section
20 Closing body
21 Closed position
22 Opened position
23 Length of the rods
24 Distance of the retaining plates in the closed position
25 Distance of the retaining plates in the opened position
26 Difference 27 Diameter
30 Triangle
31 Cathetus
32 Cathetus
33 Hypotenuse

What is claimed is:

1. An airflow device comprising:
an air supply comprising an air aperture with an aperture cross-section through which air is delivered in an airflow direction;
a closing body arranged in the aperture cross-section in a direction that is orthogonal to the air flow direction, wherein the closing body comprises a deformable base structure surrounded by a wrapper, wherein the closing body is configured to substantially close the aperture cross-section as a function of a deformation of the base structure,
wherein the closing body substantially blocks the aperture cross-section when the base structure with the wrapper is maintained in a closed position, and
wherein the closing body partially opens the aperture cross-section when the base structure with the wrapper is maintained in an opened position.

2. The airflow device according to claim 1, wherein the base structure comprises equal length rods, which are attached at their ends facing away from one another to two parallel and coaxially arranged retaining plates, which are rotatable relative to one another in order to deform the base structure.

3. The airflow device according to claim 2, wherein the retaining plates are discs.

4. The airflow device according to claim 2, wherein the rods are hinged to the retaining plates.

5. The airflow device according to claim 2, wherein the rods are completely surrounded by the wrapper between their ends facing away from one another.

6. The airflow device according to claim 1, wherein the wrapper is formed from a flexible material.

7. The airflow device according to claim 1, wherein the base structure with the wrapper takes the form of a straight, circular cylinder in the closed position, wherein the base structure with the wrapper takes the form of a rotational hyperboloid in the opened position.

8. The airflow device according to claim 1, wherein a cross-section of the aperture is rectangular.

9. The airflow device according to claim 1, wherein air moving in the air flow direction passes over, but not through, the closing body.

10. An airflow device comprising:
an air supply comprising an air aperture with an aperture cross-section,
at least two closing apparatuses arranged in the aperture cross-section and oriented parallel to one another, each of said closing apparatuses comprising a closing body, wherein the closing body comprises a deformable base structure surrounded by a wrapper, wherein the closing body is configured to substantially close the air aperture as a function of a deformation of the base structure,
wherein the closing bodies substantially close the air aperture when the base structures with the wrappers are maintained in a closed position, and
wherein the closing bodies partially open the air aperture when the base structures with the wrappers are maintained in an opened position.

11. The airflow device according to claim 10, wherein a cross-section of the aperture is rectangular.

12. A motor vehicle comprising the airflow device of claim 1.

* * * * *